(12) United States Patent
Rozman et al.

(10) Patent No.: US 7,501,799 B2
(45) Date of Patent: Mar. 10, 2009

(54) ENGINE START SYSTEM WITH A REGULATED PERMANENT MAGNET MACHINE

(75) Inventors: Gregory I. Rozman, Rockford, IL (US); Matthew L. Wilhide, Cherry Valley, IL (US); Arthur A. Pershall, Kalispell, MT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 132 days.

(21) Appl. No.: 11/820,639

(22) Filed: Jun. 20, 2007

(65) Prior Publication Data
US 2008/0315584 A1    Dec. 25, 2008

(51) Int. Cl.
  H02P 9/14 (2006.01)
  H02P 3/00 (2006.01)
  H02P 9/06 (2006.01)
  H02P 15/00 (2006.01)
  H02P 9/00 (2006.01)
  H02P 9/10 (2006.01)

(52) U.S. Cl. .................. 322/46; 322/10; 322/57; 322/59

(58) Field of Classification Search ............... 322/10, 322/46, 57, 59
See application file for complete search history.

(56) References Cited

U.S. PATENT DOCUMENTS

| | | | | |
|---|---|---|---|---|
| 4,661,762 A * | 4/1987 | Baker | ...................... | 322/40 |
| 4,692,671 A * | 9/1987 | Dishner et al. | ............. | 318/11 |
| 4,695,776 A * | 9/1987 | Dishner et al. | ............. | 318/14 |
| 4,841,202 A * | 6/1989 | Dishner et al. | ............. | 318/14 |
| 4,905,134 A * | 2/1990 | Recker et al. | ............. | 363/98 |
| 4,939,441 A * | 7/1990 | Dhyanchand | ............. | 318/718 |
| 4,992,721 A * | 2/1991 | Latos | ...................... | 322/10 |
| 5,013,929 A * | 5/1991 | Dhyanchand | ............. | 290/31 |
| 5,015,941 A * | 5/1991 | Dhyanchand | ............. | 322/10 |
| 5,036,267 A * | 7/1991 | Markunas et al. | ......... | 322/10 |
| 5,055,764 A * | 10/1991 | Rozman et al. | ............. | 322/10 |
| 5,068,590 A * | 11/1991 | Glennon et al. | ............. | 322/10 |
| 5,077,485 A * | 12/1991 | Rashid | ...................... | 307/84 |
| 5,097,195 A * | 3/1992 | Raad et al. | ............. | 322/10 |
| 5,384,527 A * | 1/1995 | Rozman et al. | ............. | 322/10 |
| 5,430,362 A * | 7/1995 | Carr et al. | ............. | 318/779 |
| 5,461,293 A * | 10/1995 | Rozman et al. | ............. | 318/603 |
| 5,493,200 A * | 2/1996 | Rozman et al. | ............. | 322/10 |

(Continued)

*Primary Examiner*—Nicholas Ponomarenko
*Assistant Examiner*—Pedro J Cuevas
(74) *Attorney, Agent, or Firm*—Stephen G. Mican

(57) ABSTRACT

An electromechanical power transfer system that transfers power between a direct current (DC) electrical power system and a prime mover, comprises: a permanent magnet machine (PMM) comprising a permanent magnet (PM) rotor that rotates a drive shaft of the prime mover, a stator and a control coil; that an inverter/rectifier system for converting DC power from the DC power system to multiphase alternating current (AC) power on an AC bus; a control coil current regulator system for regulating current through the control coil; wherein the inverter/rectifier system responds to a position reference signal, a current load feedback signal and a current load reference signal to regulate acceleration of the PMM; wherein the control coil current regulator system responds to a control coil current reference signal and a control coil current feedback signal to regulate current in the PMM; and wherein the power transfer system starts in an open loop mode, and the first and second speed switches respond to a closed loop enable mode to switch from their open loop mode to their closed loop mode.

25 Claims, 1 Drawing Sheet

U.S. PATENT DOCUMENTS

| | | | |
|---|---|---|---|
| 5,495,163 A * | 2/1996 | Rozman et al. | 322/10 |
| 5,587,647 A * | 12/1996 | Bansal et al. | 322/45 |
| 5,594,322 A * | 1/1997 | Rozman et al. | 322/10 |
| 6,392,418 B1 * | 5/2002 | Mir et al. | 324/503 |
| 6,583,995 B2 * | 6/2003 | Kalman et al. | 363/35 |
| 6,731,083 B2 * | 5/2004 | Marcinkiewicz | 318/254.2 |
| 6,903,523 B2 * | 6/2005 | Peterson | 318/400.09 |
| 7,042,227 B2 * | 5/2006 | Mir et al. | 324/503 |
| 7,116,083 B2 * | 10/2006 | Kalman et al. | 322/59 |
| 7,132,816 B1 * | 11/2006 | Markunas et al. | 318/400.02 |
| 7,262,539 B2 | 8/2007 | Dooley | 310/184 |
| 2002/0105335 A1 * | 8/2002 | Mir et al. | 324/503 |
| 2002/0110007 A1 * | 8/2002 | Kalman et al. | 363/35 |
| 2004/0145356 A1 * | 7/2004 | Kalman et al. | 322/46 |
| 2006/0226721 A1 | 10/2006 | Dooley | 310/113 |
| 2007/0080655 A1 * | 4/2007 | Tesch et al. | 318/432 |

* cited by examiner

ENGINE START SYSTEM WITH A REGULATED PERMANENT MAGNET MACHINE

FIELD OF THE INVENTION

The invention relates to electric starting systems for prime movers, and more particularly to electric starting systems for prime movers driven by a permanent magnet machine (PMM).

BACKGROUND OF THE INVENTION

Electrical power generation systems powered by variable speed prime movers that require highly regulated electrical output, such as electrical power generation systems used for aeronautical applications, generally use a wound field synchronous machine (WFSM) that serves as an electrical generator. This is because it is easy to adjust rotor current to regulate electrical output of a WFSM. In aeronautical applications, the prime mover is often a gas turbine engine that has a normal rotational velocity that exceeds 20,000 revolutions per minute (rpm). Due to the rotational velocity limitations of the WFSM, such electrical power generation systems generally require a reduction gearbox between the prime mover and the WFSM. This increases weight, cost and complexity of the electrical power generation systems.

Electrical power generation systems may alternatively employ an electrical machine of the permanent magnet type as an electrical generator. Such a permanent magnet machine (PMM) is capable of much higher rotational velocity than a WRSM of similar output and therefore it is capable of direct coupling to the prime mover, thereby eliminating the reduction gearbox. This results in reduced weight, cost and complexity of an electrical power generation system. However, traditional PMMs have no convenient means to alter magnetic flux for regulating their output.

Especially in aeronautical applications, it is desirable to utilize the electrical power generating system as a starting system for the prime mover. This reduces weight and bulk compared to utilizing separate starting and generating systems and it has the potential for reducing overall cost as well. The starting system may require a sensorless motor control that employs an open loop mode during start up to at least some minimum speed and a closed loop mode above this minimum speed.

SUMMARY OF THE INVENTION

The invention comprises a PMM with a control coil in a engine starting system for a prime mover that establishes a predetermined minimum current, including zero current, in the control coil during an initial open loop mode followed by controlled current in control coil in a closed loop mode regulated by back-emf and rotor position detection.

The invention generally comprises an electromechanical power transfer system that transfers power between a direct current (DC) electrical power system and a prime mover, comprising: a permanent magnet machine (PMM) comprising a permanent magnet (PM) rotor that rotates a drive shaft of the prime mover, a stator with a multiphase alternating current (AC) winding coupled to the AC bus for developing a rotating magnetic field with a magnetic flux path that causes rotation of the PM rotor and a control coil with a winding that has a configuration to generate a magnetic field with flux that varies the reactance of the stator winding upon the application of current through the control coil; a plurality of AC current sensors for sensing the current in each phase of the multiphase AC bus and generating respective AC bus current signals that represent the current level of each phase; an average current detector that receives the AC bus current signals and generates a respective current load feedback signal; a back electromotive force (emf) detector coupled to the AC bus that detects back emf generated by the stator in response to the application of AC power to the stator and generates a back emf signal representative of the detected level of back emf; a rotor position/speed estimator that receives the back emf signal and generates an estimated rotor position signal that is representative of the position of the rotor, an estimated rotor speed signal that is representative of the speed of the rotor and a closed loop enable signal that indicates a speed for the electrical starting system to switch from an open loop mode of operation to a closed loop mode of operation; a control coil current sensor for generating a control coil current signal in a control coil current feedback loop that is representative of the level of electrical current in the control coil; a first speed switch that switches between an open loop position reference signal that represents a desired position of the rotor in an open loop mode and the estimated rotor position signal that represents the position of the rotor in a closed loop mode to provide a position reference signal; a second speed switch that switches between an open loop current reference signal that represents a desired control coil current level in the open loop mode and a closed loop current reference signal that represents a desired control coil current level in the closed loop mode to provide a control coil current reference signal; an inverter/rectifier system for converting DC power from the DC power system to multiphase alternating current (AC) power on an AC bus; a control coil current regulator system for regulating current through the control coil; wherein the inverter/rectifier system responds to the position reference signal, the current load feedback signal and a current load reference signal to regulate acceleration of the PMM; wherein the control coil current regulator system responds to the control coil current reference signal and the control coil current feedback signal to regulate current in the PMM; and wherein the power transfer system starts in the open loop mode, the rotor position/speed estimator generates the closed loop enable signal that indicates a speed for the electrical starting system to switch from the open loop mode of operation to the closed loop mode of operation at a predetermined rotor speed, and the first and second speed switches respond to the closed loop enable mode to switch from their open loop mode to their closed loop mode.

DETAILED DESCRIPTION OF THE INVENTION

Figure 1:
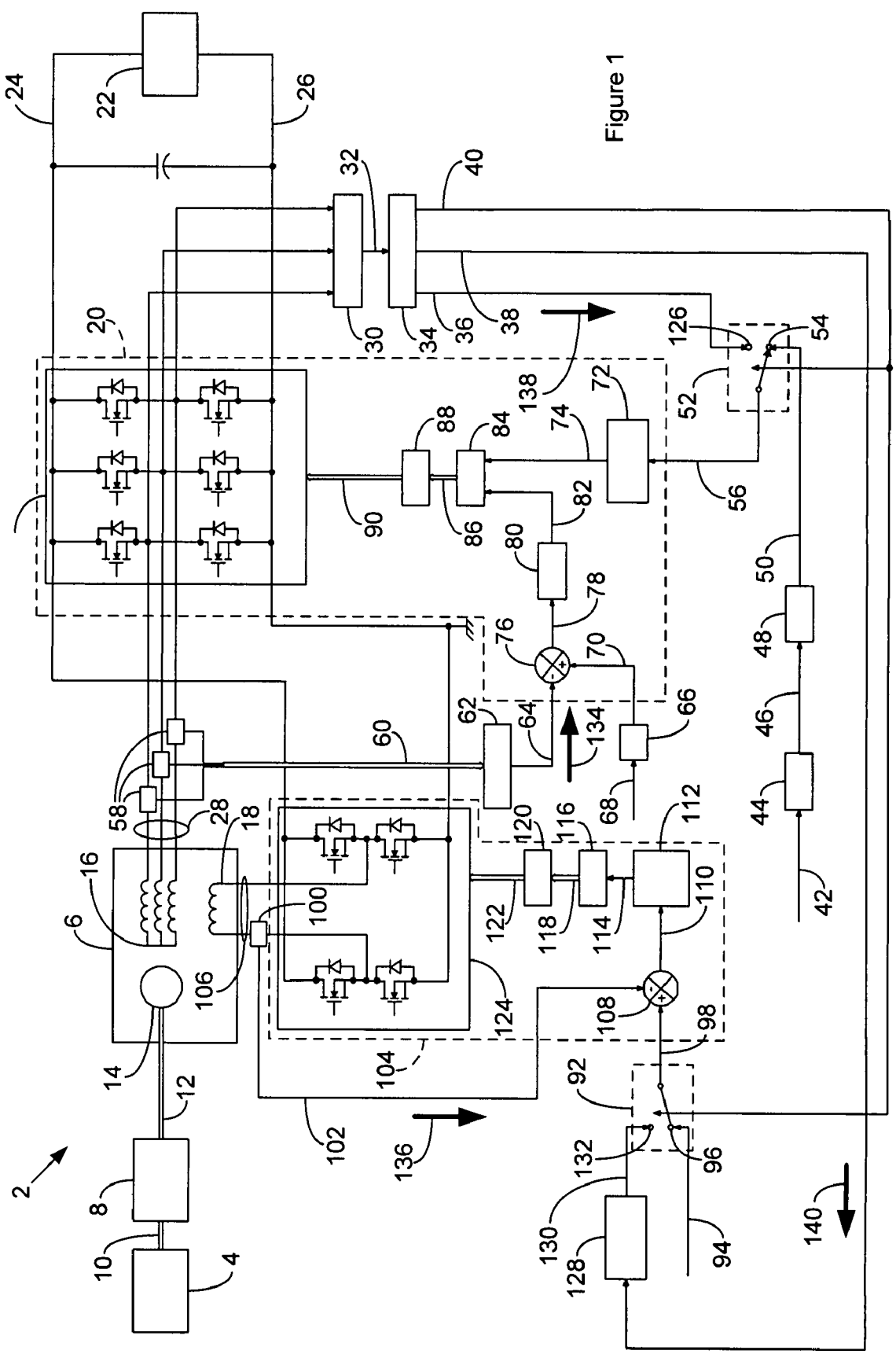
FIG. 1 is a high-level schematic diagram of an electrical starting system according to a possible embodiment of the invention.

FIG. 1 is a high-level schematic diagram of an electrical starting or electromechanical power transfer system 2 according to a possible embodiment of the invention. A prime mover 4, such as a gas turbine engine, couples to a PMM 6, typically by way of a gearbox 8 and an associated prime mover drive shaft 10 and a gearbox drive shaft 12. The PMM 6 comprises a permanent magnet (PM) rotor 14, a stator 16 and a supplementary magnetic field generating control coil 18. The rotor 6 comprises a permanent magnet type rotor. The stator 8 comprises a multiphase alternating current (AC) stator winding that is typically three phase AC. The control coil 18 comprises a winding in proximity to the stator winding 8 that is capable of generating a magnetic field with flux that passes through the stator winding 8 upon application of electrical current through the control coil 10.

PMM 6 may have any suitable construction. An example of a suitable construction is found in co-pending applications Ser. Nos. 10/996,411 and 11/420,614, by Dooley, both incorporated herein by reference. With a PMM 6 of such construction, control coil 10 generates a magnetic field with flux that is capable of selectively saturating a portion of a magnetic circuit associated with a stator 8 upon application of electrical current through the control coil 10, thereby varying the reactance of the stator 8. The flux of the control coil field varies the reactance of the stator 8 over a very wide range, thereby permitting control of PMM stator current rather than generated electromagnetic force (emf). This design also has an intrinsic magnetic feedback feature that causes the reactance of the PMM to remain at a minimum value until the stator current attains a specific ratio to the control current, at which point the reactance abruptly increases with output current. This makes the PMM behave as a constant current source regardless of electrical load. The incorporated references describe further details of the construction and operation of such a PMM 4.

To start the prime mover 4, an inverter/rectifier system 20, powered by a direct current (DC) source 22 by way of a DC bus 24 with a DC return 26, generates multiphase AC power that it transfers to the stator 8 the PMM 6 by way of a multiphase AC bus 28. The multiphase AC is typically 3 phase as shown in FIG. 1. The stator 8 develops a rotating magnet field whose flux interacts with the magnetic flux of the rotor 6 to cause rotation of the rotor 6. The rotor 6, coupled to the prime mover 14 by way of the gearbox 8, thus rotates the prime mover driveshaft 10 to start the prime mover 4.

A back electromotive force (emf) detector 30 couples to the AC bus 28 to detect back emf that the stator 8 generates in response to the rotation of the rotor 6 and generate a back emf signal on a back emf detector output line 32 that is representative of the detected level of back emf. A rotor position/speed estimator 34 receives the back emf signal on the back emf detector output line 32 and generates an estimated rotor position signal on a position signal line 36 that is representative of the position of the rotor 14, an estimated rotor speed signal on a speed signal line 38 that is representative of the speed of the rotor 14 and a closed loop enable signal on a closed loop enable line 40 that indicates a speed of the rotor 14 for the electrical starting system 2 to switch from an open loop mode of operation to a closed loop mode of operation.

Upon start-up, the power transfer system 2 assumes an open loop mode and it receives an open loop acceleration reference signal on an open loop acceleration reference signal line 42 that represents a desired open loop rate of acceleration for the PMM 6. A 1/S integration function 44 receives the open loop acceleration reference signal on the open loop acceleration reference signal line 42 and generates a corresponding open loop speed reference signal on an open loop speed reference signal line 46. A 1/S mod2n integral function 48 receives the open loop speed reference signal on the speed reference signal line 46 and generates a corresponding open loop position reference signal on an open loop position reference signal line 50.

A first speed switch 52 receives the open loop position reference signal on the open loop position reference signal line 50 by way of a first switch rest state terminal 54 to provide a position reference signal on a first switch output line 56.

A plurality of AC current sensors 58 measure current in each leg of the multi-phase AC bus 28 and generate respective AC bus current signals that represent the current level of each phase on a current sensors data bus 60. An average current detector 62 receives the AC bus current signals on the current sensors data bus 60 and generates a current load feedback signal on an average current detector output line 64. A $1/K_t$ reciprocal torque function 66 receives a torque reference signal on a torque reference signal line 68 and generates a corresponding current load reference signal on a current load reference signal line 70.

The inverter/rectifier system 20 receives the position reference signal on a first switch output line 56, the current load feedback signal on the average current detector output line 64 and the current load reference signal on the current load reference line 70 and converts DC power on the DC bus 24 to multiphase AC power on the AC bus 28 with a frequency and power level that is sufficient to achieve the desired open loop rate of acceleration for the PMM 6 to start the prime mover 4 in response to the combination of these signals.

The inverter/rectifier system 20 operates as follows. A 120-degree commutation look-up table 72 receives the position reference signal on the first switch output line 56 and generates a corresponding sector position signal on a 120-degree commutation look-up table output line 74. An inverter circuit comparator 76 compares the current load feedback signal on the average current detector output line 64 with the current load reference signal on the current load reference signal line 70 to develop an AC bus current error signal on an inverter circuit comparator output line 78 that is representative of the difference in these signals.

An inverter circuit proportional integral (PI) controller 80 receives the AC bus current error signal on the inverter comparator output line 78 and generates a corresponding inverter duty cycle signal on an inverter circuit PI controller output line 82. An inverter circuit pulse width modulator (PWM) 84 receives the sector position signal on the 120-degree commutation look-up table output line 74 and the inverter duty cycle signal on the inverter circuit PI controller output line 82 and generates a corresponding plurality of inverter circuit modulator signals on an inverter circuit modulator output bus 86.

An inverter circuit gates drive module 88 receives the inverter circuit modulator signals on the inverter circuit modulator bus 86 and generates a corresponding plurality of inverter gates drive signals on an inverter circuit gates drive bus 90. An inverter/rectifier circuit 20 receives the inverter gates drive signals on the inverter circuit gates drive bus 90 and generates a corresponding frequency multiphase AC signal on the AC bus 20 with a frequency and duty cycle sufficient to achieve the desired open loop rate of acceleration for the PMM 6*te*.

A second speed switch 92 receives an open loop current reference signal that represents a desired level of current for the power transfer system 2 during open loop operation from an open loop current reference signal line 94 by way of a second switch rest state terminal 96 to provide a control coil current reference signal on a second switch output line 98. A control coil current sensor 100 measures current that passes through the control coil 18 and generates a control coil current signal on a control coil current sensor output line 102 that is representative of the measured current.

A control coil current regulator system 104 receives the control coil current reference signal on the second switch output line 98 and the control coil current reference signal on the control coil current sensor output line 102 to generate a level of control coil current for the control coil 18 between a pair of control coil current lines 106 that maintains the desired level of current during open loop operation of the power transfer system 2. The control coil current regulator system 104 operates as follows.

A control coil circuit comparator 108 receives the control coil current reference signal on the second switch output line 98 and the control coil current signal on the control coil current sensor output line 102 and generates a control coil current error signal on a control coil circuit comparator output line 110 that is representative of the difference of these signals.

A control coil circuit PI controller 112 receives the control coil current error signal on the control coil circuit comparator output line 110 and generates a corresponding control coil current modulator drive signal on a control coil circuit PI controller output line 114. A control coil circuit PWM 116 receives the control coil current modulator drive signal on the control coil circuit PI controller output line 114 and generates a corresponding plurality of control coil circuit modulator signals on a control coil circuit modulator output bus 118. A control circuit gates drive module 120 receives the control coil circuit PWM modulator signals on the control coil circuit PWM modulator output bus 116 and generates a corresponding plurality of control coil circuit gates drive signals on a control coil circuit gates drive module output bus 122. A control coil current regulator circuit 124 receives DC from the DC bus 24 and the control coil circuit gates drive signals on the control coil circuit gates drive module output bus 122 to generate the control coil current between the pair of control coil current lines 122 that regulates the current that the power transfer system 2 supplies to the PMM 6.

When the PMM 6 reaches a predetermined low speed, the power transfer system 2 assumes a closed loop mode. When the rotor position/speed indicator 34 detects that the PMM 6 has reached this predetermined speed, it generates the closed loop speed switch enable signal on the closed loop speed switch enable line 40. The first speed switch 52 responds to the closed loop speed switch enable signal on the closed loop speed switch enable line 40 by receiving the estimated rotor position signal on a position signal line 36 by way of a first switch active state terminal 126 to provide the position reference signal on the first switch output line 56. A control coil circuit look-up table 128 receives the estimated rotor speed signal on the speed signal line 38 and generates a closed loop current reference signal on a control coil circuit look-up table output line 130 with a value of current appropriate for the value of the estimated rotor speed signal. The second speed switch 92 responds to the closed loop speed switch enable signal on the closed loop speed switch enable line 40 by receiving the closed loop current reference signal on the control coil circuit look-up table output line 130 by way of a second switch active state terminal 132 to provide the current reference signal on the second switch output line 98.

The power transfer system 2 thus assumes an open loop mode upon start-up wherein it responds to an open loop acceleration reference signal that represents a desired initial open loop rate of acceleration for the PMM 6 and a torque reference signal that represents a desired level of torque exerted by the PMM 6 and with acceleration of the PMM 6 at the desired level of acceleration and torque whilst it also responds to an open loop control coil reference signal that represents a desired level of current for the control coil 18 during the open loop mode with current supplied to the control coil 18 at the desired level. When the power transfer system 2 accelerates the PMM 6 to a desired low speed, it then switches to a closed loop mode wherein it automatically monitors the current draw of the PMM 6 on the AC bus and the back emf that it develops as well as the current that it draws from the AC bus as well as the level of control coil current to maintain a level of torque for the remainder of the starting process that corresponds to the torque reference signal.

The power transfer system 2 thus has two modes of operation during a process of starting the prime mover 4. The first is an open loop mode wherein the inverter/rectifier system 20 controls the acceleration of the PMM 6 to a desired open loop rate of acceleration in response to the open loop acceleration reference signal on the open loop acceleration reference signal line 42, a current load feedback loop 134 that comprises the current load feedback signal on the average current detector output line 64 and the torque reference signal on a torque reference signal line 68, whilst the control coil current regulator system 104 generates a level of control coil current for the control coil 18 that maintains a desired level of current for the power transfer system 2 during open loop operation in response to the open loop current reference signal that represents a desired level of current for the power transfer system 2 during open loop operation on the open loop current reference signal line 94 and a control coil current feedback loop 136 that comprises the control coil feedback signal on the control coil current sensor output line 102.

The second mode is a closed loop mode wherein the inverter/rectifier system 20 controls the acceleration of the PMM 6 in accordance with the current load feedback loop 134 that comprises the current load feedback signal on the average current detector output line 64, the torque reference signal on a torque reference signal line 68 and a rotor position feedback loop 138 that comprises the estimated rotor position signal on the position signal line 36, whilst the control coil current regulator system 104 generates a level of control coil current for the control coil 18 that maintains a desired level of current for the power transfer system 2 in response to a rotor speed feedback loop 140 that comprises the estimated rotor speed signal on the speed signal line 38 and the control coil current feedback loop 136 that comprises the control coil feedback signal on the control coil current sensor output line 102.

The described embodiment of the invention is only an illustrative implementation of the invention wherein changes and substitutions of the various parts and arrangement thereof are within the scope of the invention as set forth in the attached claims.

The claimed invention is:

1. An electromechanical power transfer system that transfers power between a direct current (DC) electrical power system and a prime mover, comprising:
   a permanent magnet machine (PMM) comprising a permanent magnet (PM) rotor that rotates a drive shaft of the prime mover, a stator with a multiphase alternating current (AC) winding coupled to the AC bus for developing a rotating magnetic field with a magnetic flux path that causes rotation of the PM rotor and a control coil with a winding that has a configuration to generate a magnetic field with flux that varies the reactance of the stator winding upon the application of current through the control coil;
   a plurality of AC current sensors for sensing the current in each phase of the multi-phase AC bus and generating respective AC bus current signals that represent the current level of each phase;
   an average current detector that receives the AC bus current signals and generates a respective current load feedback signal;
   a back electromotive force (emf) detector coupled to the AC bus that detects back emf generated by the stator in response to the application of AC power to the stator and generates a back emf signal representative of the detected level of back emf;

a rotor position/speed estimator that receives the back emf signal and generates an estimated rotor position signal that is representative of the position of the rotor, an estimated rotor speed signal that is representative of the speed of the rotor and a closed loop enable signal that indicates a speed for the electrical starting system to switch from an open loop mode of operation to a closed loop mode of operation;

a control coil current sensor for generating a control coil current signal in a control coil current feedback loop that is representative of the level of electrical current in the control coil;

a first speed switch that switches between an open loop position reference signal that represents a desired position of the rotor in an open loop mode and the estimated rotor position signal that represents the position of the rotor in a closed loop mode to provide a position reference signal;

a second speed switch that switches between an open loop current reference signal that represents a desired control coil current level in the open loop mode and a closed loop current reference signal that represents a desired control coil current level in the closed loop mode to provide a control coil current reference signal;

an inverter/rectifier system for converting DC power from the DC power system to multiphase alternating current (AC) power on an AC bus;

a control coil current regulator system for regulating current through the control coil;

wherein the inverter/rectifier system responds to the position reference signal, the current load feedback signal and a current load reference signal to regulate acceleration of the PMM;

wherein the control coil current regulator system responds to the control coil current reference signal and the control coil current feedback signal to regulate current in the PMM; and wherein the power transfer system starts in the open loop mode, the rotor position/speed estimator generates the closed loop enable signal that indicates a speed for the electrical starting system to switch from the open loop mode of operation to the closed loop mode of operation at a predetermined rotor speed, and the first and second speed switches respond to the closed loop enable mode to switch from their open loop mode to their closed loop mode.

2. The power transfer system of claim 1, wherein the inverter/rectifier system comprises:

a multiphase inverter/rectifier circuit that provides multiphase AC power to the AC bus;

a commutation look-up table that receives the position reference signal and generates a corresponding sector position signal;

an inverter circuit comparator for comparing the current load feedback signal with a current load reference signal and generating an AC bus current error signal that is representative of the difference between the current load feedback signal and the current load reference signal;

an inverter circuit proportional integral (PI) controller for receiving the AC bus current error signal and generating a corresponding inverter duty cycle signal; and an inverter circuit modulator for receiving the sector position signal and the inverter duty cycle signal to generate a corresponding plurality of inverter circuit modulator signals that control the frequency and duty cycle of the inverter/rectifier circuit.

3. The power transfer system of claim 1, wherein the control coil current regulator system comprises:

a control coil current error comparator for comparing the control coil current signal with the reference control coil current signal and generating a control coil current error signal representative of the difference between the control coil current signal and the reference control coil current signal;

a control coil current error PI controller for receiving the control coil current error signal and generating a corresponding control coil current modulator drive signal;

a control coil circuit modulator for receiving the control current modulator drive signal and generating a corresponding plurality of control coil circuit modulator signals; and a control coil current regulator circuit that receives the control coil circuit modulator signals and supplies the control coil with current that has a level that varies in response to the control coil circuit modulator signals.

4. The power transfer system of claim 1, further comprising a control coil circuit look-up table that receives the estimated rotor speed signal and generates a corresponding value for the closed loop current reference signal.

5. The power transfer system of claim 1, further comprising:

a 1/S integration function for receiving an open loop acceleration reference signal that represents desired open loop rate of acceleration for the rotor in the open loop mode and generating a corresponding open loop speed reference signal; and a 1/S mod2n integral function for receiving the open loop speed reference signal and generating the open loop position reference signal.

6. The power transfer system of claim 1, further comprising:

a $1/K_t$ reciprocal torque function that receives a torque reference signal and generates the current load reference signal.

7. The power transfer system of claim 2, further comprising:

an inverter circuit gates drive module for receiving the inverter circuit modulator signals and generating a corresponding plurality of inverter circuit gates drive signals that operate the inverter/rectifier circuit.

8. The power transfer system of claim 3, further comprising:

a control coil circuit gates drive module for receiving the control circuit modulator signals and generating a corresponding plurality of control circuit gates drive signals that operate the control coil current regulator circuit.

9. The power transfer system of claim 2, wherein the inverter circuit modulator comprises a pulse width modulator (PWM).

10. The power transfer system of claim 3, wherein the control circuit modulator comprises a pulse width modulator (PWM).

11. The power transfer system of claim 1, wherein the power transfer system comprises an electrical starting system for the prime mover.

12. The power transfer system of claim 11, wherein the power transfer system comprises an electrical generating system powered by the prime mover.

13. An electromechanical power transfer system that transfers power between a direct current (DC) electrical power system and a prime mover, comprising:
- a permanent magnet machine (PMM) comprising a permanent magnet (PM) rotor that rotates a drive shaft of the prime mover, a stator with a multiphase alternating current (AC) winding coupled to the AC bus for developing a rotating magnetic field with a magnetic flux path that causes rotation of the PM rotor and a control coil with a winding that is capable of generating a magnetic field with flux that varies the reactance of the stator winding upon the application of current through the control coil;
- a plurality of AC current sensors for sensing the current in each phase of the multi-phase AC bus and generating respective AC bus current signals that represent the current level of each phase;
- an average current detector that receives the AC bus current signals and generates a respective current load feedback signal;
- a back electromotive force (emf) detector coupled to the AC bus that detects back emf generated by the stator in response to the application of AC power to the stator and generates a back emf signal representative of the detected level of back emf;
- a rotor position/speed estimator that receives the back emf signal and generates an estimated rotor position signal that is representative of the position of the rotor, an estimated rotor speed signal that is representative of the speed of the rotor and a closed loop enable signal that indicates a speed for the electrical starting system to switch from an open loop mode of operation to a closed loop mode of operation;
- a control coil current sensor for generating a control coil current signal in a control coil current feedback loop that is representative of the level of electrical current in the control coil;
- a first speed switch that switches between an open loop position reference signal that represents a desired position of the rotor in an open loop mode and the estimated rotor position signal that represents the position of the rotor in a closed loop mode to provide a position reference signal;
- a second speed switch that switches between an open loop current reference signal that represents a desired control coil current level in the open loop mode and a closed loop current reference signal that represents a desired control coil current level in the closed loop mode to provide a control coil current reference signal;
- a multiphase inverter/rectifier circuit that provides multiphase AC power to the AC bus;
- a commutation look-up table that receives the position reference signal and generates a corresponding sector position signal;
- an inverter circuit comparator for comparing the current load feedback signal with a current load reference signal and generating an AC bus current error signal that is representative of the difference between the current load feedback signal and the current load reference signal;
- an inverter circuit proportional integral (PI) controller for receiving the AC bus current error signal and generating a corresponding inverter duty cycle signal; and
- an inverter circuit modulator for receiving the sector position signal and the inverter duty cycle signal to generate a corresponding plurality of inverter circuit modulator signals that control the frequency and duty cycle of the inverter/rectifier circuit;
- a control coil current error comparator for comparing the control coil current signal with the reference control coil current signal and generating a control coil current error signal representative of the difference between the control coil current signal and the reference control coil current signal;
- a control coil current error PI controller for receiving the control coil current error signal and generating a corresponding control coil current modulator drive signal;
- a control coil circuit modulator for receiving the control current modulator drive signal and generating a corresponding plurality of control coil circuit modulator signals; and
- a control coil current regulator circuit that receives the control coil circuit modulator signals and supplies the control coil with current that has a level that varies in response to the control coil circuit modulator signals;
- wherein the inverter/rectifier circuit responds to the position reference signal, the current load feedback signal and a current load reference signal to regulate acceleration of the PMM;
- wherein the control coil current regulator circuit responds to the control coil current reference signal and the control coil current feedback signal to regulate current in the PMM; and
- wherein the power transfer system starts in the open loop mode, the rotor position/speed estimator generates the closed loop enable signal that indicates a speed for the electrical starting system to switch from the open loop mode of operation to the closed loop mode of operation at a predetermined rotor speed, and the first and second speed switches respond to the closed loop enable mode to switch from their open loop mode to their closed loop mode.

14. The power transfer system of claim 13, further comprising a control coil circuit look-up table that receives the estimated rotor speed signal and generates a corresponding value for the closed loop current reference signal.

15. The power transfer system of claim 13, further comprising:
- a 1/S integration function for receiving an open loop acceleration reference signal that represents desired open loop rate of acceleration for the rotor in the open loop mode and generating a corresponding open loop speed reference signal; and
- a 1/S mod2n integral function for receiving the open loop speed reference signal and generating the open loop position reference signal.

16. The power transfer system of claim 13, further comprising:
- a $1/K_t$ reciprocal torque function that receives a torque reference signal and generates the current load reference signal.

17. The power transfer system of claim 13, further comprising:
- an inverter circuit gates drive module for receiving the inverter circuit modulator signals and generating a corresponding plurality of inverter circuit gates drive signals that operate the inverter/rectifier circuit.

18. The power transfer system of claim 13, further comprising:
- a control coil circuit gates drive module for receiving the control circuit modulator signals and generating a corresponding plurality of control circuit gates drive signals that operate the control coil current regulator circuit.

19. The power transfer system of claim 13, wherein the inverter circuit modulator comprises a pulse width modulator (PWM).

20. The power transfer system of claim 13, wherein the control circuit modulator comprises a pulse width modulator (PWM).

21. The power transfer system of claim 13, wherein the power transfer system comprises an electrical starting system for the prime mover.

22. The power transfer system of claim 21, wherein the power transfer system comprises an electrical generating system powered by the prime mover.

23. A method of transferring power between a direct current (DC) electrical power system that comprises an inverter/rectifier system coupled between an alternating current (AC) bus and a DC bus and a prime mover by means of a permanent magnet machine (PMM) that has a PM rotor coupled to the prime mover and a stator with a multiphase AC winding coupled to the AC bus, comprising the steps of:

generating a magnetic field with flux that varies the reactance of the stator winding upon the application of current through the control coil;

generating AC bus current signals for each phase of the AC bus that represent the current level of each phase;

generating a current load feedback signal that represents the average current of the AC bus current signals;

generating a back emf signal that is representative of the level of back emf that the stator generates in response to the application of AC power;

generating an estimated rotor position signal that is representative of the position of the rotor, an estimated rotor speed signal that is representative of the speed of the rotor and a closed loop enable signal that indicates a speed for the electrical starting system to switch from an open loop mode of operation to a closed loop mode of operation;

generating a control coil current signal in a control coil current feedback loop that is representative of the level of electrical current in the control coil;

a first switching process to switch between an open loop position reference signal that represents a desired position of the rotor in an open loop mode and the estimated rotor position signal that represents the position of the rotor in a closed loop mode to provide a position reference signal;

a second switching process to switch between an open loop current reference signal that represents a desired control coil current level in the open loop mode and a closed loop current reference signal that represents a desired control coil current level in the closed loop mode to provide a control coil current reference signal;

an inverter/rectifier system for converting DC power from the DC power system to multiphase alternating current (AC) power on an AC bus;

a control coil current regulator system for regulating current through the control coil;

wherein the inverter/rectifier system responds to the position reference signal, the current load feedback signal and a current load reference signal to regulate acceleration of the PMM;

wherein the control coil current regulator system responds to the control coil current reference signal and the control coil current feedback signal to adjust control coil current that regulates current level in the PMM; and wherein the power transfer process starts in the open loop mode by generating the closed loop enable signal that indicates a speed for the power transfer process to switch from the open loop mode of operation to the closed loop mode of operation at a predetermined rotor speed, and the first and second switching processes respond to the closed loop enable mode to switch from their open loop mode to their closed loop mode.

24. The power transfer process of claim 23, wherein the power transfer process comprises a process for starting the prime mover.

25. The power transfer process of claim 23, wherein the power transfer process further comprises the transfer of power from the prime mover to the electrical power system.

* * * * *